CONNECTOR AND METHOD

Original Filed May 10, 1971

INVENTOR.
Irving R. Metcalf
BY Parker, Carter & Markey
Attorneys.

United States Patent Office

Re. 27,496
Reissued Apr. 24, 1973

27,496

CONNECTOR AND METHOD

Irving R. Metcalf, St. Charles, Ill., assignor to Ideal Industries, Inc., Sycamore, Ill.

Original No. 3,542,406, dated Nov. 24, 1970, Ser. No. 810,566, Mar. 26, 1969. Application for reissue May 10, 1971, Ser. No. 141,727
Int. Cl. F16l *15/00*
U.S. Cl. 285—183 12 Claims

Matter enclosed in heavy brackets [ ] appears in the original patent but forms no part of this reissue specification; matter printed in italics indicates the additions made by reissue.

ABSTRACT OF THE DISCLOSURE

[A connecter for joining flexible conduit, for example of the metallic type, which is made of stamped sheet metal parts and furnace brazed with the threads being formed of a coiled wire so that deburring is unnecessary and the thickness of the metal under the threads will be insured.]

*A tubular body section having threads attached at one end and a nut held captive on the other end with a tool engaging portion attached intermediate the threads and nut and a method of making the foregoing including the steps of forming the tubular body section from sheet metal, positioning the tool engaging portion on the tubular body section, providing a thread form on the tubular body section adjacent one end thereof, brazing the parts together, thereafter positioning the nut on the other end of the tubular body section and deforming said other end of said tubular body section to hold the nut captive.*

SUMMARY OF THE INVENTION

This invention is concerned with a method and procedure for making a structure for a flexible conduit connecter or any threaded fitting and the connecter produced thereby.

A primary object is a connecter for joining flexible conduit that controls and insures the wall thickness under the threads.

Another object is a method of making such connecter which does not produce any chips in forming the threads.

Another object is a connecter assembly which is self-jiggering in the subsequent furnace brazing operation during its manufacture.

Another object is a method of making pipe threads that is inexpensive.

Another object is a flexible conduit connecter and method of making it which does not require any castings.

Another object is a method and connecter of the above type which results in a connecter with a clean surface having no residual fluid accumulations which must be removed for plating and corrosion resistance.

Another object is a connecter of the above type which can be made in a series of press operations followed by furnace brazing.

Another object is a method of making a connecter of the above type which does not require any thread rolling or thread cutting which is quite expensive.

Another object is a method of making threads on a connecter of the above type which guarantees a certain wall thickness under the threads.

Another object is a method of making a tapered pipe thread in a furnace brazing operation which insures a tight joint.

Another object is a method and connecter of the above type which completely eliminates any castings thereby cutting down on scrap and tool loss.

Another object is a fitting and method of the above type which gives a ferrous product without any casting and a minimum of machining.

Another object is a method and connecter of the above type made on spring coiling and stamping equipment.

Other objects will appear from time to time in the ensuing specification and drawing in which:

DESCRIPTION OF THE PREFERRED EMBODIMENT

Figure 1:
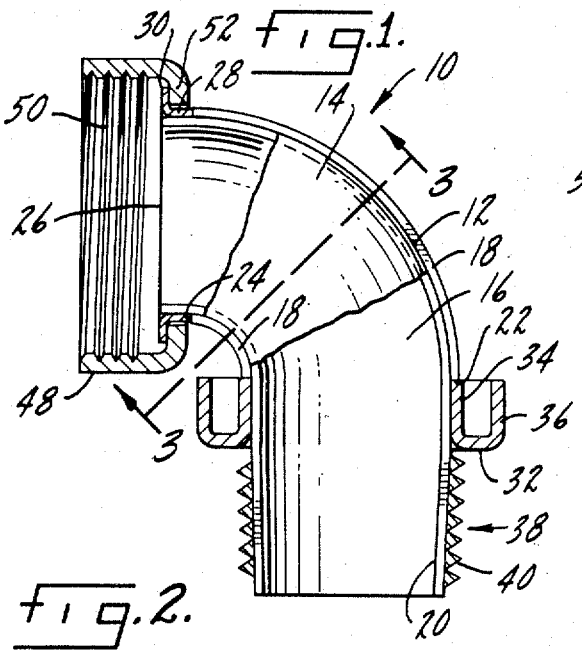
FIG. 1 is a side view, partly in section, showing one form of the invention.
Figure 2:
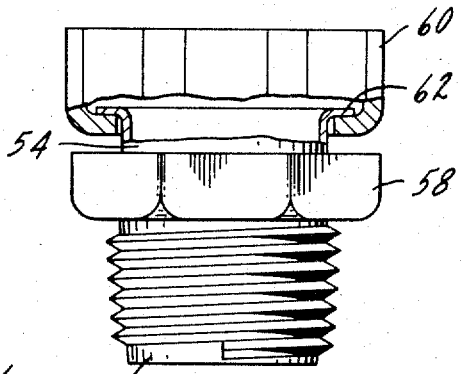
FIG. 2 is a bottom view of FIG. 1.
Figure 5:
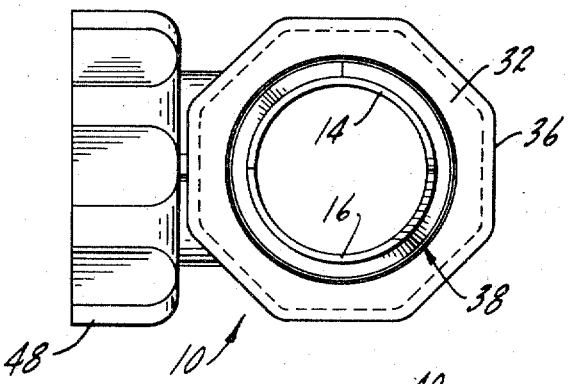
FIG. 5 is a side view, partly in section, of a variant form.
Figure 6:
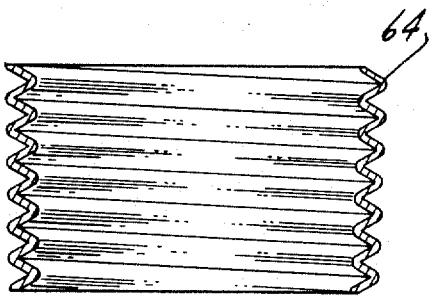
FIG. 6 is a section through a variant form of thread formation.
Figure 4:
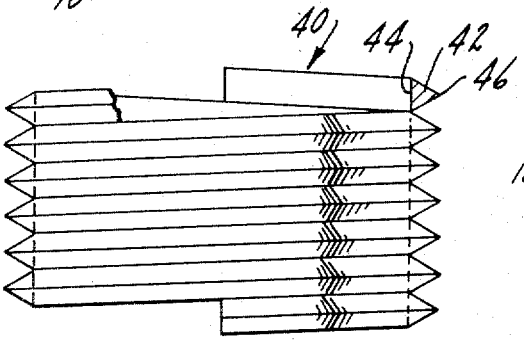
FIG. 4 is an enlarged view, partly in section, of the coil.
Figure 3:
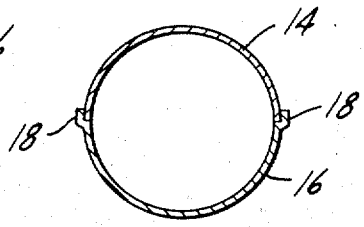
FIG. 3 is a section along line 3—3 of FIG. 1.
Figure 1:
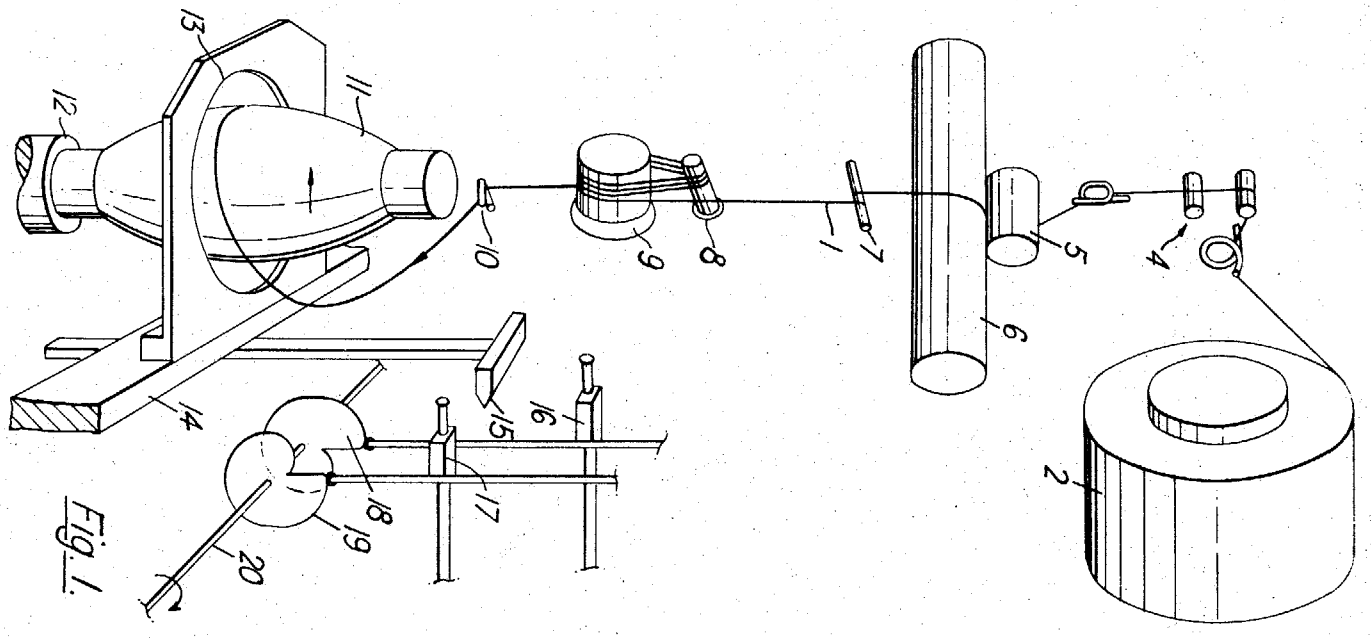

In FIG. 1 a connecter is indicated generally at 10 in the form of an elbow with a body section 12 made of two halves 14 and 16, one of the halves 16 having flanges or offsets 18 which overlap the abutting edges of the other half 14. Otherwise, the two halves are mirror images of each other and can be made from sheet metal suitably formed as stampings on conventional presses, for example progressive die or transfer presses. The ends of each half are tapered somewhat as at 20 and the overlapping flange or edge 18 on the one half terminates as at 22. Thus, the areas of the abutting edges in the tapered portion 20 are directly abutting with no overlap. The flanges or overlap 18 also terminate at the other end as at 24 in spaced relation to the end 26 so that a sleeve or ring 28 may be slipped on and preliminarily positioned against the edge 24 of the overlap or flange. While the ring 28 has been shown as flared out as at 30, it is initially a simple sleeve or ring or cylinder and the flare 30 is caused later.

An octagonal body 32 which is cylindrical on the inside at 34 and octagonal on the outside at 36 may be stamped or formed from the sheet material and then slipped over the taper 20 until it abuts the edge 22 of the flange or overlap 18.

A thread formation 38 is formed on the taper by coiling a wire 40 of suitable length into a generally cylindrical coil and then slipping it over the taper 20. The wire is shown as having a triangular cross section 42 with one flat side 44 being disposed on the inside of the resulting coil so that the inner surface of the coil presents a smooth cylindrical appearance with the outer edge or point 46 of the triangular forming the crest of the resultant threads. Wire that is triangular in cross section is particularly appropriate since the sides or flanks of the threads resulting from the triangle will be at 60°, which is appropriate for pipe threads.

The wire can be coiled to an internal diameter which is slightly smaller than the maximum outside diameter of the taper 20 so that when the cylindrical inner surface of the coil is slipped onto the taper, the coil will be expanded somewhat throughout its length, thereby giving a slight compression or loaded fit. Since the exterior of the taper increases in diameter from the end, the coil will be progressively expanded from the small end up. But the degree of interference should be sufficiently small such that no great effort is necessary to assemble the two.

Assembly is as follows: The two halves 14 and 16 are brought together, the sleeve 28 is slipped on along with the octagon 32 and the coil 40, all three of which hold the two halves together and properly positioned with their edges abutting. In this form, the unit can be furnace brazed which will seal together the abutting edges of the two halves 14 and 16, will seal the sleeve 28 on one end of

METHOD AND APPARATUS FOR WINDING YARN

Original Filed April 5, 1965 6 Sheets-Sheet 1